(12) United States Patent
Spalla et al.

(10) Patent No.: US 8,838,822 B2
(45) Date of Patent: Sep. 16, 2014

(54) MEDIA CONVERTER AND A SYSTEM FOR MUTUALLY CONVERTING A PACKET-BASED DATA STREAM INTO A SERIAL DATA STREAM

(75) Inventors: Pietro Spalla, Biella (IT); Daniel Cardenas, Turin (IT); Antonio Nespola, Turin (IT); Roberto Gaudino, Turin (IT)

(73) Assignee: Instituto Superiore Mario Boella, Turin (IT)

( * ) Notice: Subject to any disclaimer, the term of this patent is extended or adjusted under 35 U.S.C. 154(b) by 1487 days.

(21) Appl. No.: 12/067,284

(22) PCT Filed: Sep. 20, 2006

(86) PCT No.: PCT/EP2006/009162
§ 371 (c)(1), (2), (4) Date: Aug. 20, 2008

(87) PCT Pub. No.: WO2007/039119
PCT Pub. Date: Apr. 12, 2007

(65) Prior Publication Data
US 2009/0024756 A1    Jan. 22, 2009

(30) Foreign Application Priority Data
Sep. 20, 2005 (EP) .................... 05020517
Sep. 20, 2006 (WO) ............... PCT/EP2006/009162

(51) Int. Cl.
*G06F 15/16* (2006.01)
*H04L 1/00* (2006.01)
*H04L 25/06* (2006.01)
*H04L 7/04* (2006.01)

(52) U.S. Cl.
CPC ......... H04L 1/0057 (2013.01); *H04L 2007/045* (2013.01); H04L 25/068 (2013.01)
USPC ...................... 709/231; 370/506; 370/395.64

(58) Field of Classification Search
CPC ............ H04L 29/06027; H04L 1/1812; H04L 27/2626; H04L 12/6418; G06F 11/079; G06F 2213/0038
USPC .................. 709/231, 232; 370/536, 537, 538; 358/440
See application file for complete search history.

(56) References Cited

U.S. PATENT DOCUMENTS 5,668,810 A   9/1997  Cannella, Jr. et al.
5,790,057 A   8/1998  Linde et al.
(Continued)

FOREIGN PATENT DOCUMENTS

EP   1509007 A   2/2005
GB   2410159 A   7/2005
WO   03075477 A  9/2003

OTHER PUBLICATIONS

Patent Abstracts of Japan. vol. 2000, No. 20. Jul. 10, 2001.
(Continued)

*Primary Examiner* — Michael Chao
*Assistant Examiner* — Feliciano Mejia
(74) *Attorney, Agent, or Firm* — Amin, Turocy & Watson, LLP

(57) ABSTRACT

A media converter, a system and a method for converting packet based data into serial data and vice versa are provided. The media converter comprises a first interface configured to receive and provide a first type of data stream based on data packets, a second interface configured to receive and provide a second type of data stream based on a continuous serial bit stream, and a signal processor connected to the first and second interfaces and configured to convert said first type of data stream into said second type of data stream and vice versa on the basis of a block encoding/decoding algorithm and a line encoding/decoding algorithm. Thus, enhanced bit error rate may be obtained, thereby allowing the use of optical transmission channels of increased length.

47 Claims, 6 Drawing Sheets

(56) References Cited

U.S. PATENT DOCUMENTS

Figure 1C:
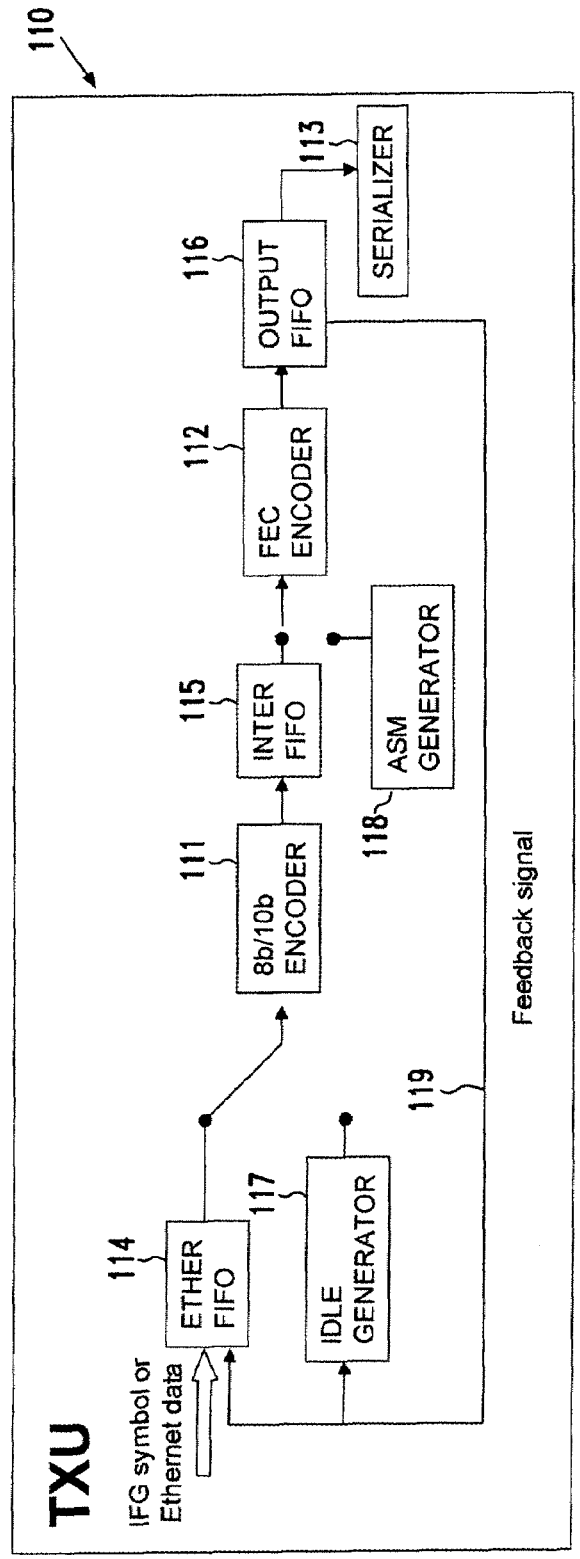

| | | | |
|---|---|---|---|
| 6,040,792 A * | 3/2000 | Watson et al. | 341/100 |
| 6,311,239 B1 | 10/2001 | Matthews | |
| 6,320,877 B1 * | 11/2001 | Humphrey et al. | 370/474 |
| 2003/0204806 A1 | 10/2003 | Hisada et al. | |
| 2004/0202205 A1 * | 10/2004 | Sheth et al. | 370/539 |
| 2005/0005189 A1 | 1/2005 | Khermosh et al. | |
| 2005/0036524 A1 | 2/2005 | Wojtowicz | |
| 2005/0201162 A1 | 9/2005 | Shibata et al. | |

OTHER PUBLICATIONS

IBM Technical Disclosure Bulletin. "Idle Sequence in a Serial Link Optimized to Reduce Electromagnetic Interference" vol. 38, No. 12. Dec. 1995, pp. 315-316.
Chang, et al. "A 0.4-4Gbls CMOS Quad Transreceiver Cell Using On-Chip Regulated Dual-Loop PLLs" IEEE vol. 38, No. 5. May 2003, pp. 747-754.
Senior. "Optical Fiber Communications. Principles & Practice" (1995) Prentice Hall, pp. 184-185.
International Search Report and Written Opinion for PCT/EP2006/009162, completed Jan. 25, 2007 and mailed Feb. 1, 2007, 4 pages.

* cited by examiner

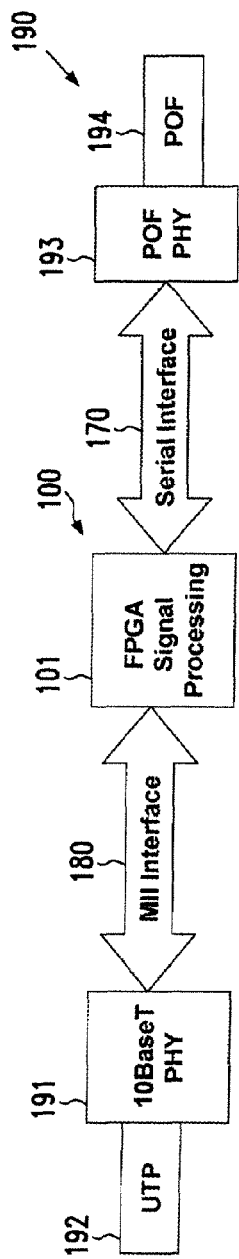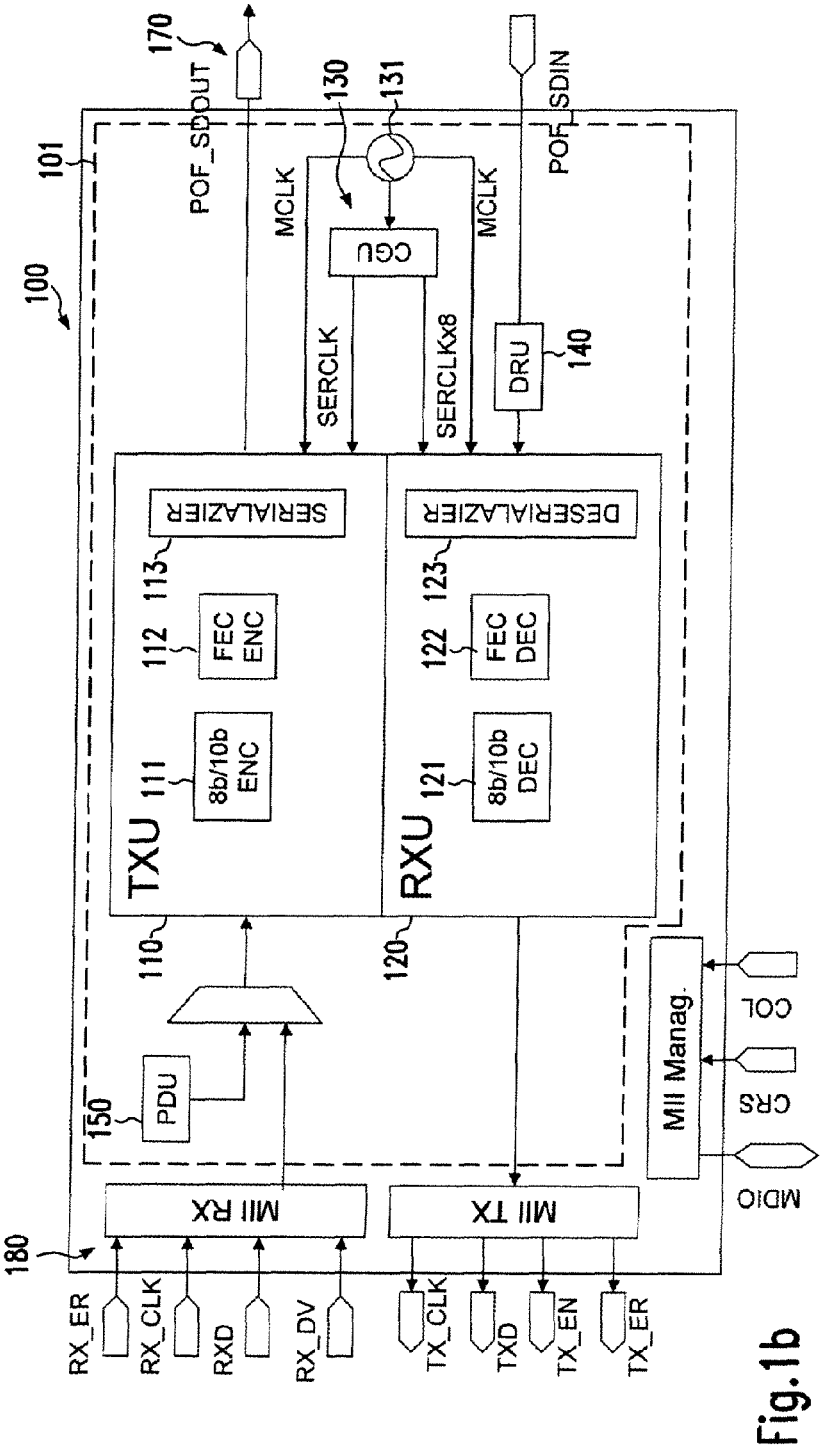
Fig.1a
Fig.1b

MEDIA CONVERTER AND A SYSTEM FOR MUTUALLY CONVERTING A PACKET-BASED DATA STREAM INTO A SERIAL DATA STREAM

FIELD OF THE INVENTION

Generally, the present invention relates to the field of data processing and more particularly to network technologies, in which a data stream provided in packets according to a specified protocol is to be converted into a serial data stream and vice versa, as may be required, for instance in the signal conversion between a twisted pair technology, such as Ethernet technologies, and fibre optic systems.

Nowadays, the availability of extremely compact and sophisticated integrated circuits has significantly fueled the application of these devices, for instance in the form of microprocessors, microcomputers, control units, and the like, for a huge variety of applications. Typically, the increased employment of electronic control and computing devices is associated with an increased requirement of data exchange, wherein a moderately high data rate in combination with high data integrity and low cost with respect to material consumption and installation of corresponding networks is necessary. For example, the so-called twisted pair technique, such as the Ethernet technology, is a widely used mechanism for data exchange between remote stations, wherein the distance between the individual stations significantly depends on the type of transmission medium used. For instance, a copper based cable connection may not allow high-speed data traffic over long distances without undue effort with respect to signal recovering and error correction encoding. Thus, data transfer via optical fibres is of high interest, since optical fibres can carry Ethernet signals for considerably longer distances compared to copper media. In order to comply with various demands of the different transmission media, such as copper-based twisted pair cables and optical fibres, several low cost multifunction single chip media converters may be available that provide 10 Mbps signal conversion between twisted pair and fibre optic Ethernet technologies. However, a typical problem associated with implementing a high bandwidth optical fibre network resides in the high cost of fibre alignment and maintenance. This may mainly be due to the moderately small diameter of glass optical fibres that are frequently used in network applications due to the reduced optical losses. However, due to the cost and maintenance specific disadvantages of glass optical fibres, much effort has been invested to use different materials, such as plastic optical fibres (POF) for network applications.

The core of step index plastic optical fibres is made of an inexpensive material, such as poly-methyl-metha acrylate (PMMA), which is surrounded by an inexpensive lower index material, such as a fluorine containing polymer, while the core material has a diameter of more than 0.98 mm, thereby significantly reducing the problems for interconnecting and coupling various fibre segments compared to glass optical fibres. Due to the significantly higher signal attenuation compared to glass optical fibres, the plastic optical fibres, however, are presently limited to applications in which the signal transfer medium is used for short distances only. Thus, in typical conventional applications, an optical link based on plastic optical fibres is restricted to a maximum distance of 200 m, thereby significantly reducing the applicability of fibre optical network connections.

It is therefore an object of the present invention to provide an enhanced technique that enables a signal conversion between network technologies using a packet-based data stream into an appropriate serial data stream and vice versa that may be used for optical transfer media, wherein an enhanced bit error rate performance is obtained.

Generally, the present invention is directed at a technique that enables the mutual conversion of a data stream organized in packets and a serial data stream. The same technique allows to reduce bit error rate (BER) and provides for the possibility of using plastic optical fibres having a length of more than 200 m, thereby overcoming the limitations of conventional media converters used for interfacing between twisted pair Ethernet technologies and fibre optical connections.

According to one aspect of the present invention, a media converter is provided and comprises a first interface configured to receive and provide a first type of data stream based on data packets, and a second interface configured to receive and provide a second type of data stream based on a continuous serial bit stream. Moreover, the media converter comprises a signal processor connected to the first and second interfaces that is configured to convert the first type of data stream into the second type of data stream, and vice versa, on the basis of a block encoding/decoding algorithm and a line encoding/decoding algorithm.

Thus, the media converter according to the present invention is based on block coding and line coding techniques, which allow a bidirectional signal conversion of a packet based data stream into a proprietary protocol based continuous serial data stream, which may provide the potential for converting the asynchronous 10baseT Ethernet full duplex signal into an isochronous propriety signal of a specified coding scheme. In one direction the media converter according to the present invention may receive the packet-based data stream from respective copper-based media, such as unshielded twisted pair cables, and may provide the generated isochronous data stream to any appropriate data transfer medium, such as an optical transmission channel comprising a plastic optical fibre of increased length or a glass optical fibre of increased length. In the other direction, the media converter according to the present invention may receive the isochronous signal, which may then be converted back into a packet-based data stream in correspondence with the rules of the respective standard of the packet based data stream. Hereby, the block encoding/decoding and line encoding/decoding techniques provide the potential for an enhanced performance with respect to a reduced bit error rate, thereby compensating for any increased signal losses that may occur in the optical fibres of increased length. Additionally, the continuous transmission provided by the media converter and the characteristics of the proprietary protocol, according to the present invention, enables a highly effective synchronization of data at the receiver end, which may also significantly contribute to an overall performance increase.

In one preferred embodiment, the second type of data stream represents an NRZ (non-return to zero) encoded bit stream. Thus, by using a balanced NRZ-encoding significantly reduces the bandwidth required on the transmission channel, for instance compared to a standard 10baseT Manchester encoding. Consequently, the data rate per optical fibre may be increased, thereby facilitating high-density data traffic in cost efficient optical transmission media.

In a further preferred embodiment, the signal processor comprises a block encoding/decoding section operating on the basis of a forward error correction algorithm. Due to the efficient error correction mechanism implemented in the media converter according to the present invention, data loss during the transmission may efficiently be compensated for, thereby significantly reducing repeated transmission of data packets and thus contributing to an increased power budget of the network system. Moreover, in combination with certain inner properties of the forward error correction algorithm, such as the monitoring of error probability, feedback information may efficiently be provided for a further enhancement of the link performance.

In a further preferred embodiment, the signal processor comprises a line encoding/decoding section operating on the basis of an 8 bit/10 bit conversion algorithm. Due to the 8 bit/10 bit line encoding/decoding algorithm, any problems associated with DC-balance may be overcome or at least significantly reduced, while the provision of an overhead of two bits per eight bit symbol may allow to add representative special markers for monitoring the conversion procedure.

According to a further embodiment, the signal processor further comprises a transmitter unit including a line encoder, a block encoder and a serializer, and further comprises a receiver unit including a deserializer, a block decoder and a line decoder. By providing the receiver unit and the transmitter unit as corresponding functional blocks as specified above, a high degree of design flexibility is provided, as the receiver units and the transmitter unit may be realized as separate physical entities or may be integrated in a common physical block, for instance in a field programmable gate array, an ASIC (application specific IC) or in any other appropriate form, such as printed wiring boards, and the like. Hereby, the design of the individual components of the transmitter unit and/or receiver unit may also be provided in any appropriate form so as to comply with design criteria. For example, the line encoder/decoder may be implemented in a field programmable gate array by means of a commercial IP core, while in other embodiments a dedicated ASIC may be provided for this purpose. Similarly, other components of the receiver unit and the transmitter unit may be provided as reconfigurable components or in the form of dedicated ASICs.

According to a further embodiment, the signal processor further comprises a clock generation unit connected to the transmitter unit and the receiver unit. In this way, the clock generation unit may provide any reference clock signals used in the various components of the media converter, such as the reading or encoding and decoding operations performed therein. Moreover, the clock generation unit may provide, on the basis of a master clock signal, a time reference for the transfer of data via the first and second interfaces.

In another illustrative embodiment, the media converter comprises, in addition to the clock generation unit or as an alternative thereto, a clock input that is configured to receive an external clock signal for operating the transmitter unit and the receiver unit. Consequently, the time synchronization with the data streams transferred via the first and second interfaces may be based on an external source, thereby reducing complexity of the media converter in terms of compensation of a timing mismatch between the data streams and an internal reference clock.

In a further advantageous embodiment, the signal processor further comprises a data recovering unit connected to the second interface to receive a serial bit stream and configured to identify individual bits in the serial bit stream. Thus, the data recovering unit enables the media converter to extract the data from the incoming serial data stream and to move the extracted data into a separate clock domain, thereby significantly increasing data integrity, which may have been compromised during the preceding transfer in an optical fibre medium.

According to a preferred embodiment, the data recovering unit is a digital unit operating on the basis of an over-sampling technique. By providing the data recovering unit as a completely digital unit, any data bits may reliably be detected in the serial data stream. The value of a specific bit under consideration may be detected by means of a plurality of sampling time points, while standard digital components, such as flip-flops, a shift register, and the like, may be used in creating corresponding time domains for the respective sampling times and detecting the corresponding logic value at the respective time domain. Hereby, the input data bits may be identified in the serial data stream, while any clock signal used for transmitting the serial data stream may not be recovered.

In a further preferred embodiment, the data recovering unit comprises a majority voter mechanism for determining a value of a data bit received via the second interface. Consequently, two or more values obtained from respective time domains, each representing a specific point in time for sampling the serial data stream, may be used in determining the value of a data bit of the serial data stream. Therefore, an enhanced robustness with respect to noise, such as possible spurious spikes being present on the incoming data analogue signal, may be achieved.

In one illustrative embodiment, the majority voter mechanism is based on at least three sampling time domains, thereby providing a high degree of immunity with respect to any interference signals included in the serial data stream.

In a further illustrative embodiment, the data recovering unit comprises a phase locked loop circuit for extracting data bits and for recovering a clock signal from the serial bit stream. Consequently, well-established integrated circuits and components may be used for identifying respective digital values of the incoming bit stream, wherein simultaneously the corresponding clock signal may be obtained, which may be advantageous in the further synchronization of the recovered data bits with respect to block decoding and line decoding operations.

In a further advantageous embodiment, the signal processor further comprises a pad data unit connected to the first interface and configured to add specified symbols to the first type of data stream during silence phases in the first type of data stream. That is, the pad data unit is configured to provide predefined symbols during any gaps, also referred to as interframe gaps, between respective data packets in the first data stream. Since the media converter according to the present invention provides, at the second interface, a serial data stream at a substantially constant bit rate, irrespective of the data traffic at the first interface, which is typically provided in the form of bursts and with silent phases for extended time periods, the pad data unit may provide for specified symbols during the interframe gaps, thereby substantially avoiding undue modulation during these interframe gaps at a receiver output side.

In a further embodiment, the first interface comprises a media independent interface including a transmitting section and a receiving section, wherein the receiving section is configured to receive a first continuous clock signal for a nibble-based data reception and wherein the transmitting section is configured to operate with a second continuous clock signal for a nibble-based data transmission. Consequently, well-established interface technologies may be used so as to receive and transmit the packet based data stream, such as Ethernet frames, wherein the medium independent interface may support frame formats such as IEEE802.3 and Ethernet.

In a further embodiment, the transmitter unit is configured to provide a continuous transmission at an output of the serializer. Consequently, a substantially continuous data stream may be provided to the serializer in order to finally provide the continuous serial data bit stream.

In a further preferred embodiment, the transmitter unit further comprises an output FIFO (first-in first-out memory) connected between the block encoder and the serializer and further comprises an idle generator connected to an input of the line encoder and connected to a control output of the output FIFO. Hereby, the idle generator is configured to supply a specified idle symbol to the input of the line encoder on the basis of a predefined status of the control output. Thus, an efficient feedback mechanism is provided from the output FIFO of the transmitter unit to the input of the line encoder, thereby enabling the insertion of specified idle symbols into the bit stream, when the output FIFO may indicate that a desired minimum of symbols may no longer be available in the output FIFO. With this feedback mechanism, the serializer connected to the output of the output FIFO may be supplied with a substantially continuous symbol stream, wherein the respective idle symbols are inserted whenever respective data symbols within a data packet may not be available for line and block encoding. Moreover, the specified idle symbols may readily be identified and may thus be distinguished from data symbols on a receiver side during decoding.

In a further advantageous embodiment, the transmitter unit further comprises an attached synchronization marker (ASM) generator that is configured to insert one or more predefined synchronization symbols into a data stream provided by the line encoder. Hence, on the basis of the one or more predefined synchronization symbols a corresponding data block may be marked and may highly efficiently be identified during the decoding process at a receiver side, such as the receiver unit. Consequently, an efficient block synchronization mechanism may be provided by introducing the predefined synchronization symbols in a symbol block provided by the block encoder.

In one illustrative embodiment, the block encoder comprises a Reed-Solomon encoding scheme. In this way, well-established encoding algorithms may be used, which provide for a high data integrity and restoration capability, wherein in some embodiments, the Reed-Solomon encoder may be implemented by means of a commercial IP-core. In other embodiments, the Reed-Solomon algorithm or any other appropriate forward error correction encoding scheme may be mapped in an ASIC. Reed-Solomon codes are usually referred to as (n, k) codes where n is the total number of symbols in a code block and k is the number of actual information or data symbols. The encoder is configured to generate systematic code blocks, wherein the complete code block is built from the k data symbols after which follow (n−k) check symbols, thereby guaranteeing an error correction capability for a number of symbol errors within a symbol block that is given by $T=(n-k)/2$, wherein a symbol error may contain any number of bit errors.

In a further embodiment, the transmitter unit further comprises an input FIFO that is connected to receive data symbols via the first interface, and wherein the transmit unit further comprises an intermediate FIFO that is connected between the line encoder and the block encoder. Consequently, appropriate buffer means are provided so as to efficiently allow the transmitter unit to receive data packets at the input FIFO and provide the line-encoded symbols to the block encoder, wherein the intermediate FIFO is configured to provide for the required overhead, which is necessary for accommodating the specific redundancy, ie. the adding of the check symbols, created by the block encoder.

In a further preferred embodiment, a symbol width of the input FIFO of the transmitter unit is selected so as to provide at least one extra bit for distinguishing data symbols received from the first interface and idle symbols received from the idle generator. Consequently, based on the at least one extra bit, the symbols stored in the input FIFO may be indicated as data or idle symbols, which may allow the line encoder receiving the symbols from the input FIFO to appropriately encode the symbols so as to maintain the recognizability of data symbols and idle symbols.

In a further embodiment, the intermediate FIFO of the transmitter unit has a capacity of at least the number of check symbols and synchronization symbols generated by the ASM generator and the block encoder.

In a further advantageous embodiment, the block decoder in the receiver unit comprises a Reed-Solomon decoder. As previously explained with reference to the block encoder, the Reed-Solomon decoder includes a highly efficient error correction mechanism so as to restore data contained within a respective encoded symbol block, wherein any number of bit errors within a maximum number of faulty symbols as specified above may reliably be compensated for. Consequently, a moderately high bit error rate during the transmission may be tolerated and thus may allow the employment of less sophisticated transmission media, such as plastic optical fibres having a distance of more than 200 m, and the like. In some embodiments, the Reed-Solomon encoder may be implemented in the form of a reconfigurable FPGA (field programmable gate array), while in other embodiments, a dedicated ASIC may be provided to include a Reed-Solomon mechanism, or any other appropriate error correction mechanism.

In a further embodiment, the deserializer in the receiver unit comprises a shift register for parallelizing incoming serial data into symbols having a width that corresponds to the input width of the line decoder. In this way, well-established digital circuits may be used for converting the serial data into a parallel symbol with a required symbol width.

In still another illustrative embodiment, the receiver unit further comprises a block synchronization unit configured to identify an attached synchronization marker (ASM) symbol and also comprises a synchronization state machine for performing a synchronization procedure. Thus, the media converter comprises an efficient means for identifying a symbol block within the serial data so that the incoming serial data may efficiently be isolated into respective symbol blocks as required for the block decoding operation.

In one embodiment, the synchronization state machine comprises an acquisition state for identifying a predefined number of ASM symbols. In this way, the receiver unit may efficiently monitor the incoming serial data with respect to any ASM symbols in order to establish and maintain a high degree of synchronism with a remote block encoder, without actually gathering data bits as the synchronization status of the incoming data stream is still not ascertained. Hence, the acquisition state or phase enables efficient detection of ASM symbols, whenever synchronization is lost or not yet established.

In a further embodiment, the synchronization state machine further comprises a tracking state for gathering a predefined number of symbols according to an input block length of the block decoder. Hence, the required number of symbols may efficiently be selected and then provided to the block decoder.

In a further advantageous embodiment, the synchronization state machine further comprises an error state detection mechanism that is initiated when no ASM symbol is identified after the predefined number of symbols has been collected. In this way, appropriate measures may be taken when the ASM symbols, typically provided within the serial data stream for identifying respective symbol blocks, are not identified. For example, in some embodiments, the synchronization state machine may further collect subsequent symbols until again the required number of symbols is reached, even if an ASM symbol is not detected between two subsequent symbol blocks. Hereby, each subsequent symbol block collected without the identification of corresponding ASM symbols may be evaluated as an increased level of "synchronization loss". At a certain level, the synchronization state machine may transit into the acquisition state so as to again identify ASM symbols and "lock" into the data stream prior to gathering further symbols from the incoming data stream.

In a further embodiment, the receiver unit further comprises a block FIFO connected between the block synchronization unit and the block decoder for storing the predefined number of symbols received from the block synchronization unit. Consequently, the block encoder may operate on the basis of a complete symbol block as required.

In a further illustrative embodiment, the line decoder in the receiver unit comprises a control output to indicate whether or not a decoded symbol is an actual data symbol. Consequently, the respective symbols may appropriately be handled during the further processing so as to remove or maintain certain symbols, depending on their status indicated by the control output of the line decoder.

In a further embodiment, the receiver unit further comprises an interframe gap control unit and an interframe gap control FIFO that is connected so as to receive decoded symbols from the line decoder. Thus, the interframe gap control FIFO may receive the decoded symbols and may be manipulated in accordance with a specific strategy implemented in the interframe gap control unit.

In a further illustrative embodiment, the interframe gap control unit is configured to remove non-data symbols included in a block of data symbols and to pass all other symbols prior to storing symbols in the output FIFO. Consequently, any non-desired symbols, such as incorrectly detected special words, idle-symbols, and the like, may efficiently be removed.

Preferably, the interframe gap control unit is configured to remove any non-data symbols except for symbols representing an interframe gap of the data stream of the first type. Consequently, the output FIFO may contain only data symbols and symbols representing an interframe gap of an original packet-based data stream in accordance with specific data transfer protocols, such as the Ethernet protocol.

In a further preferred embodiment, the interframe gap control unit is further configured to add and/remove symbols from the output FIFO that represent an interframe gap of the data stream of the first type for compensating a timing mismatch between the second type of data stream and an operating frequency of the receiver unit. Consequently, the media converter according to the present invention has implemented efficient means for compensating any inevitable slight mismatch between transmitter and receiver clocks, which may finally result in a FIFO overflow, when the receiver clock is slower, or an underflow when the receiver clock is faster, by adding or removing corresponding interframe gap symbols from the output FIFO, in case an underflow or overflow of the FIFO is predicted. For this purpose, the number of symbols in the output FIFO of the receiver unit may be monitored with respect to appropriate threshold values in order to predict an overflow or an underflow situation. Once an overflow or underflow situation is predicted, an appropriate number of interframe gap symbols may be removed from or added to the output FIFO, thereby adapting the silence phases in the packet-based data stream according to the timing mismatch between receiver and transmitter.

According to a further aspect of the present invention, a bi-directional signal conversion system comprises a media converter as is described above or as will be described in the following detailed description. Moreover, the system comprises a first physical layer device configured to receive and provide a first type of data stream in the form of electric signals, and a second physical layer device configured to receive and to provide the second type of data stream in the form of optical signals.

Consequently, an efficient data conversion system is provided, which enables to convert data, received from or to be provided to an optical system, with an enhanced bit error rate performance, thereby providing for the potential of optical networks spanning distances that are increased compared to conventional optical networks.

In one illustrative embodiment, the second physical layer device comprises an optical transmitter device and an optical receiver device that is connected to an optical fibre.

In one advantageous embodiment, the optical fibre comprises a core made of plastic material. As previously explained, the reduced performance of the plastic material may efficiently be compensated for by the media converter having the enhanced bit error rate performance.

In a further embodiment, a length of the optical fibre is more than 200 m, thereby overcoming the limitations of conventional data conversion systems mediating between electrical and optical environments.

In still another illustrative embodiment, the optical receiver device and the optical transmitter device have an operating wavelength in the range of 200 nm-650 nm. Thus, these devices are well suited for operation in combination with plastic optical fibres.

In other embodiments, the optical fibre comprises a glass material core, wherein in some embodiments a length thereof is more than 400 m or even more than 2 km. Similarly, as in the case of plastic optical fibres, also for glass optical fibres the enhanced performance of the media converter allows to tolerate enhanced bit error rates in the transmission channel, so that increased distances may be spanned by the optical fibre.

According to a further aspect of the present invention a method of converting packet based data into serial data and vice versa is provided. The method comprises:

receiving an incoming packet-based data stream and converting it into a continuous serial output data stream on the basis of line encoding and block encoding, and receiving an incoming continuous data stream and converting it into a packet-based output data stream on the basis of block decoding and line decoding.

As previously explained, the method may enable an efficient data exchange between packet based transmission channels and optical transmission channels, since a high bit error rate tolerance may be achieved.

Figure 1D:
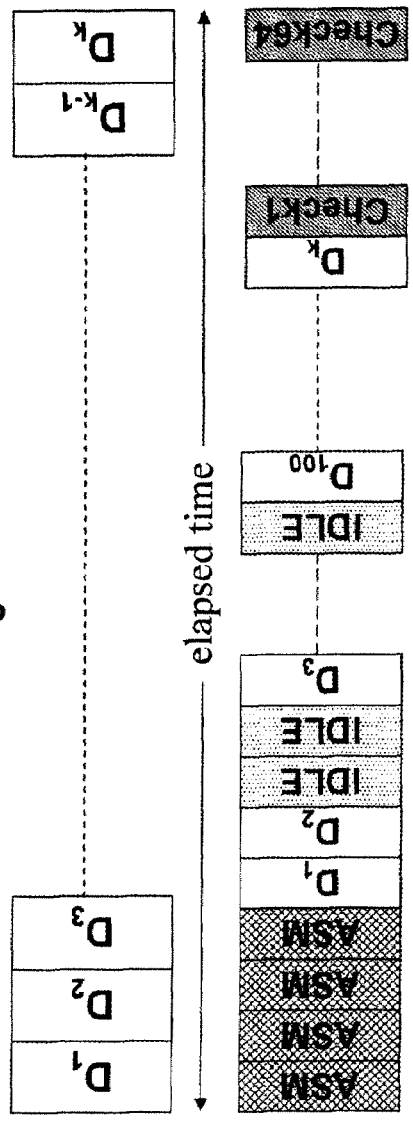
Figure 1E:
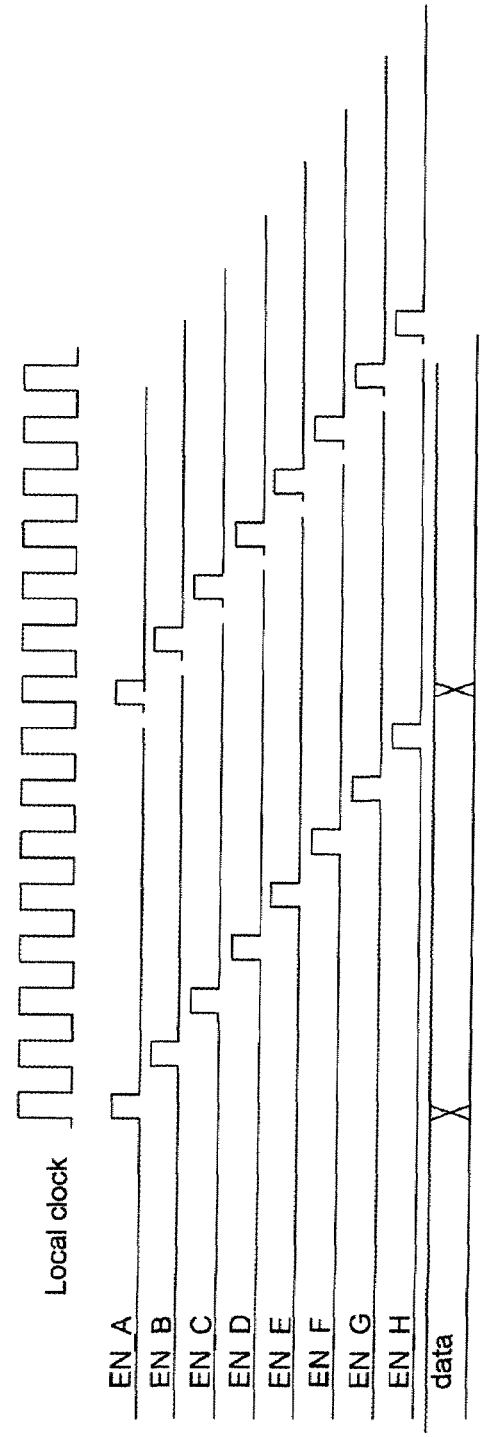
Figure 1F:
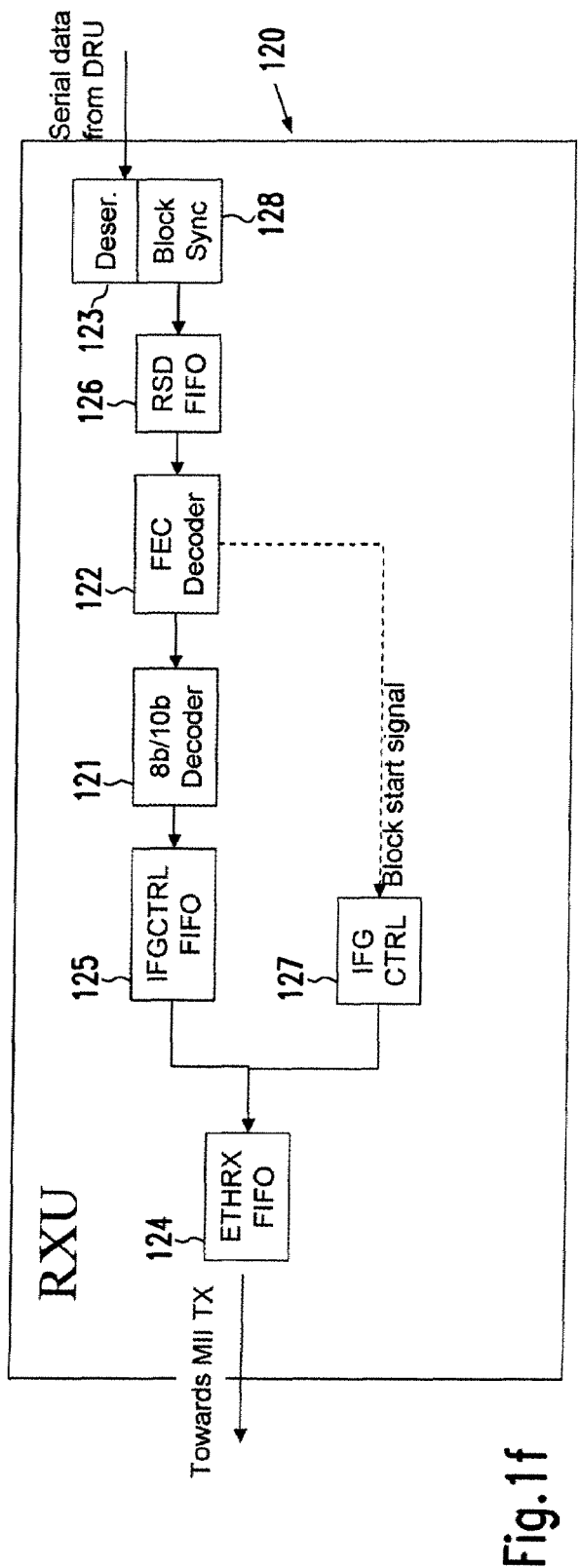
Figure 1G:
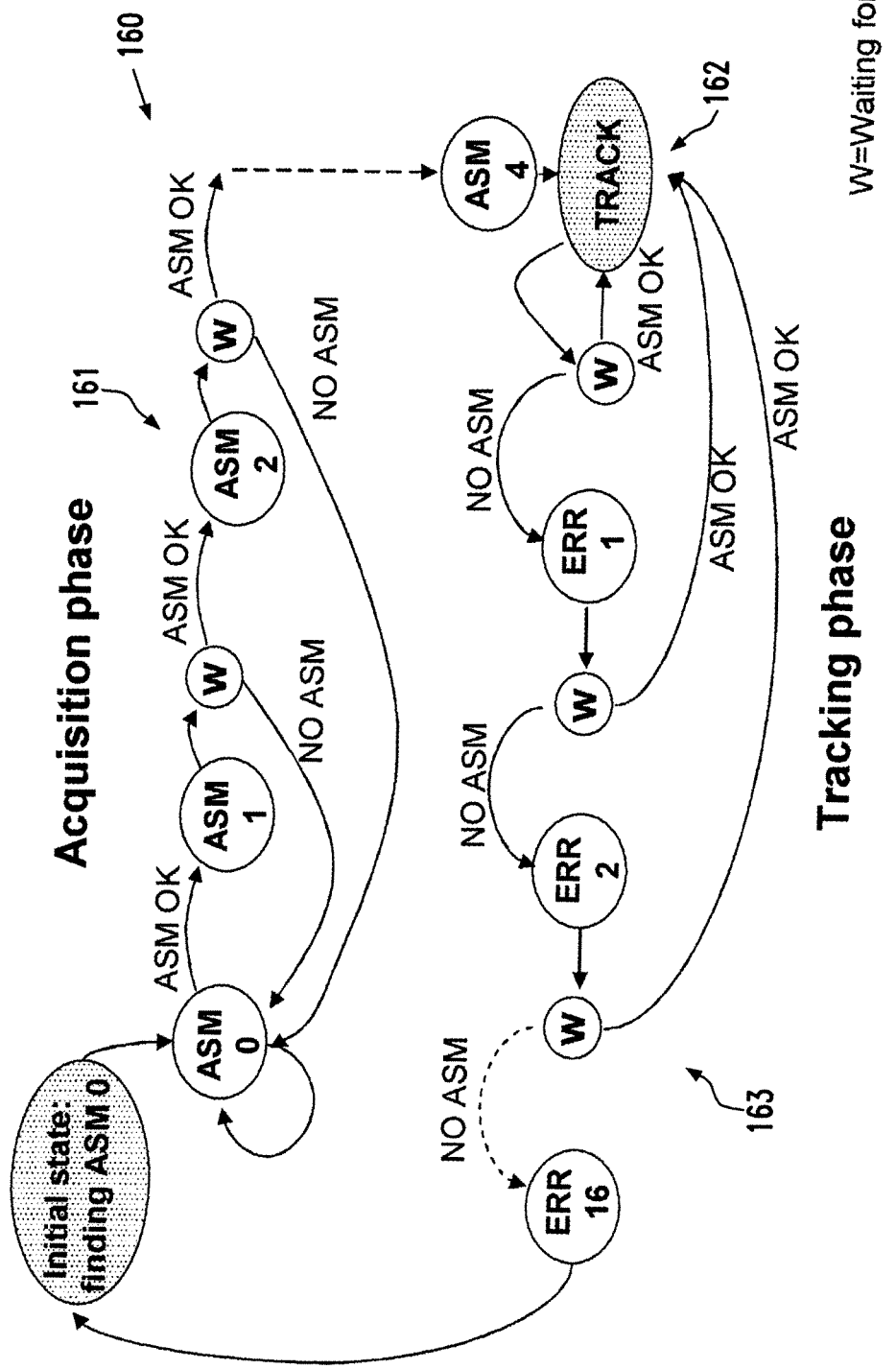

Further advantageous embodiments, objects and features are described in the appended claims and in the following detailed description, which refers to the attached drawings, in which:

FIG. 1a is a block diagram schematically illustrating a signal conversion system in accordance with one illustrative embodiment of the present invention, in which asynchronous signals from twisted pair cables may be converted into isochronous signals provided to an optical link;

FIG. 1b schematically shows a block diagram of a media converter according to one illustrative embodiment, wherein various components are illustrated including the relevant signal flow, the input/output connections and the interfaces for communication with external devices;

FIG. 1c schematically illustrates the configuration of a transmitter unit (TXU) of the media converter as shown in FIG. 1b;

FIG. 1d schematically shows a timing diagram, illustrating how a sequence of input data is modified at the output of the TXU according to one illustrative embodiment, wherein idle-symbols are added to data symbols, and ASM symbols and check data symbols are also added to the initial idle and data symbols;

FIG. 1e schematically shows a timing diagram for local clock signals and enable signals for an over-sampling procedure used for data recovery in accordance with one illustrative embodiment;

FIG. 1f schematically shows a block diagram of a receiver unit (RXU) in the media converter as shown in FIG. 1b;

FIG. 1g represents a block diagram for illustrating a state machine in the receiver unit for synchronizing encoded blocks, wherein the states may include acquisition and tracking states as well as error handling steps in accordance with one illustrative embodiment; and FIGS. 2a to 2d represent flow diagrams illustrating the handling of underflow/overflow prediction and interframe gap modulation according to one illustrative embodiment of the present invention.

With reference to the accompanying drawings the technique of signal conversion in accordance with the present invention will now be described in more detail.

FIG. 1a schematically shows a block diagram of a signal conversion system 190 comprising a first physical layer device 191, which may represent a 10baseT physical layer for an integral link to and from a network channel, such as an unshielded twisted pair cable 192. Moreover, the system 190 further comprises a second physical layer device 193 that is configured to provide optical signals to an optical transmission channel 194, such as a plastic optical fibre, glass optical fibre, and the like. As previously explained, the optical transmission channel 194, when provided in the form of a plastic optical fibre, may have a length of more than 200 m due to the enhanced bit error rate (BER) performance of a media converter 100 that is connected between the first physical layer device 191 and the second physical layer device 193. The media converter 100 comprises a first interface 180, which may be provided in the form of a media independent interface (MII) and a second serial interface 170. Moreover, the media converter 100 comprises a signal processor 101 that is configured to convert a packet-based data stream into a continuous serial data stream and vice versa on the basis of block encoding and line encoding techniques. In the system 190, the various components 191, 100 and 193 may be implemented on different platforms so as to enhance design flexibility. For instance, the first physical layer device 191, such as a 10baseT device, may be implemented in a commercial device, while the signal processor 100 may be provided in the form of a FPGA or any other appropriate dedicated circuit configuration and the second physical layer device 193 may be implemented on a custom board.

During operation of the system 190, data traffic on the transmission channel 192, ie. an unshielded twisted pair cable, may be converted in appropriate electrical signals, which may be accessed by the media converter 100 via the first interface 180. Similarly, data traffic on the optical transmission channel 194 may be converted into appropriate electrical signals in the second physical layer device 193, for instance by means of photodiodes, and these electrical signals may be accessed by the signal processor 101 via the interface 170. Similarly, any signals generated in the signal processor 101 may be provided to the first and second physical layer devices 191 and 193 via the interfaces 180 and 170. For instance, the media converter 100 may be configured to transform asynchronous Ethernet signals used in the transmission channel 192 into corresponding electrical isochronous signals that are converted into equivalent optical signals, for instance by means of led devices, and destined for the optical transmission channel 194. Hereby, the second data stream, ie. the data stream transferred via the second interface 170 is a continuous serial data stream, irrespective of the data traffic in the transmission channel 192, wherein the signal processor 101 is configured to perform the line encoding/decoding and block encoding/decoding processes so as to provide for enhanced performance with respect to bit error rate, thereby enabling to overcome the limitations of conventional systems so that plastic optical fibres may be operated on the basis of wavelength range of 400 nm-650 nm with a length of the transmission channel 194 up to 400 m. In case a longer distance is required, respective glass optical fibres may be used, wherein respective components in the second physical layer device 193 may be configured so as to operate at a wavelength in the range of 850 nm-1600 nm and especially around centre wavelengths of 850 nm, 1300 nm and 1550 nm. Hereby, glass optical fibres with a length of more than 2 km may be used in the optical transmission channel 194.

FIG. 1b schematically shows a block diagram of the media converter 100 of FIG. 1a. The media converter 100 may comprise the first interface 180 and the second interface 170, any power circuitry, in-out connectors and other hardware components which may not be relevant for the actual signal conversion and which are therefore not illustrated in FIG. 1b. The signal processor 101 as illustrated in FIG. 1b may further comprise a clock generation unit (CGU) 130, a data recovering unit (DRU) 140, a pad data unit (PDU) 150, a transmitter unit (TXU) 110 and a receiver unit (RXU) 120.

The clock generation unit 130 may comprise a master clock source 131 operating at a specified frequency, such as 54.55 MHz, wherein this clock signal may be used as timing reference for most of the signal processing steps, like data writing and reading into storage means and encoding/decoding operations performed in the transmitter unit 110 and the receiver unit 120, as will be described later on. Moreover, the clock generation unit 130 may provide a clock signal SERCLK that may be used for the serial synchronous signals carried by the second interface 170. Moreover, a further clock signal, for instance eight times faster than SERCLK, may be synthesized by the clock generation unit 130, wherein this signal may be used in the data recovery unit 140 to recover the serial synchronous signal by means of an over-sampling technique, as will be described in more detail later on. Thus, four types of reference clocks may be used in the signal processor 101:

a TX-CLK and an RX-CLK clock signal of 2.5 MHz, generated by the first physical layer device 191, wherein the clock signals may be used as timing reference for the transfer of data in nibble format between the device 191 and signal processor 101 via the interface 180;

the oscillator clock as provided by the master clock oscillator 131, which may operate at 54.55 MHz;

SERCLK as the reference clock for the serial synchronous signal conveyed by the interface 170;

SERCLKx8, ie. the reference for the data recovery by means of the data recovering unit 140.

The media converter 100 is configured so as to transmit at the serial interface 170 serial data at a constant bit rate irrespective of the packet-based data traffic at the interface 180, which typically receives the data in bursts separated by silent periods, which are also referred to as interframe gaps. Moreover, in order to achieve the desired enhanced performance with respect to bit error rate an overhead is applied to each incoming data so as to provide respective redundancy for appropriate line encoding and bit error correction mechanisms. For example, when a 10 Mbit/s bit rate is considered in the first physical layer device 191, the overhead may be as follows:

1.25 for line encoding, for instance incoming 8-bit symbols are converted into 10-bit symbols, 1.0667 for a forward error correction block coding, which may for instance be realized by a Reed-Solomon (1023, 959) code, 1.00391 for adding synchronization symbols to the transmitted data, when for instance four special characters, referred to as K28.5, are added so as to be able to retrieve the encoded blocks at the receiver end.

Thus, in the example specified above, the resulting total overhead is therefore equal to 1.338 so that the bit rate at the serial interface 170 is selected to be equal or greater than 13.38 Mbit per second. In some embodiments, the actual bit rate at the interface 170 is selected greater than the minimum value of the 13.38 Mbit per second for the above-specified overhead so that input data rates may be accepted at the interface 180 that are slightly greater than 10 Mbits per second according to the Ethernet specification.

In one advantageous embodiment, the clock generation unit 130 is configured to generate the clock reference for the synchronous signal by frequency synthesis of the master clock source 131, which may be provided integrally with the components of the signal processor 101, for instance on an FPGA board. The resulting data bit rate may be equal to 13.64 Mbits per second, which is a value 2% greater than the required minimum rate for the above-specified overhead. It should be appreciated that other clock rates may be used, when for instance other encoding and decoding strategies with a different amount of overhead are used.

In other embodiments, the clock generation unit 130 may be omitted and a corresponding clock input may be used so as to receive a clock signal from an external source. For instance, the signal SERCLK may be used as an external clock signal.

The first interface or MII 180 connects to the signal processor 101 and is configured to receive and transmit data frames, wherein in one illustrative embodiment, the interface 180 supports frame formats of the IEEE802.3 and Ethernet standards. The carrier sense (CRS) and collision signals (COL) may not be used internally, since the media converter 100 operates in a full duplex mode. Similarly, the signal MDIO of the MII may not be connected, as no configuration and monitoring of the external device 191 may be required. The initialization of the first physical layer device 191, which occurs after 32 consecutive logic ones on the MDIO port is ensured by a corresponding pull up circuitry (not shown) within the media converter 100. The digital data received from the physical layer device 191 are transferred to the signal processor 101 over a 4-bit wide data path, which is indicated as signal RXD (3:0). The digital signals processed by the signal processor 101 are returned to the device 191 over a second 4-bit wide data path indicated as TXD (3:0). Moreover, as previously explained, two continuous clocks, RX-CLK and TX-CLK are signals for the signal processor 101 and provide a timing reference for the transfer of data between device 191 and the signal processor 101.

A description of the interface terminals of the interface 180 along with their corresponding use in the signal processor 101 and the type of signal carried by the respective pins is described in the following table:

| Signal | Type | Description |
|---|---|---|
| RX-CLK | I | Continuous clock that provides the timing reference for the transfer of RX-DV, RX-ER, and RXD signals from the Ethernet device 191. The frequency of RX-CLK is equal to 2.5 MHz. |
| RX-DV | I | Driven by the external device 191, it is asserted to indicate that the device 191 is sending the recovered nibbles on RXD to the signal processor 101. |
| RXD(3:0) | I | For each RX-CLK period in which RX-DV is asserted, RXD transfers four bits of recovered data from the device 191 to the signal processor 101. RXD[0] is the least significant bit. |
| RX-ER | I | Asserted for one or more interface clock cycles, it indicates that an error (any error that can be detected by the device 191) was detected in the frame presently being transferred. It may be neglected in the present invention. |
| TX-CLK | I | It is the continuous clock that provides the timing reference for the transfer of the TX-EN, TX-ER and TXD signals form the signal processor 101 to a device 191. The operating frequency is 2.5 MHz. |
| TX-EN | O | It indicates that the application is presenting nibbles on the interface 170 for transmission. It is asserted with the first nibble and remains asserted while all the nibbles to be transmitted are provided to interface 180. |
| TXD(3:0) | O | For each TX-CLK period in which TX-EN is asserted, TXD will contain the data transferred by the signal processor 101 to the Ethernet device 191. TXD[0] is the least significant bit. When TX-EN is de-asserted, the data presented on TXD[3:0] should be ignored. |
| COL | I | It is asserted by the device 191 upon detection of a collision of the medium, and remains asserted while the collision condition persists. It is ignored when operating in full-duplex mode as in the present invention. |
| CRS | I | The device 191 shall ensure that CRS remains asserted throughout the duration of a collision condition. It is ignored in case of a full-duplex operation as in the present invention. |
| MDIO | I/O | MDIO is a bidirectional signal between the device 191 and the signal processor 101. It is used to transfer control information and status between the device 191 and the signal processor 101. |

During operation of the media converter 100 when receiving packet-based data via the interface 180, the incoming packet-based data stream may be received by the transmitter unit 110 via the pad data unit 150, which may insert any specified characters during silence phases, ie. during interframe gaps of the received packet-based data stream. The insertion of interframe gap symbols during silence phases facilitates to maintain a substantially continuous serial data stream, in combination with further time gap filling techniques, as will be discussed later on, thereby significantly reducing an undue signal modulation at the receiver side. The transmitter unit 110 comprises a line encoder 111, a block encoder 112 and a serializer 113. Thus, the data received at the transmitter unit 110, which may include any interframe gap symbols provided by the pad data unit 150, is encoded with a specified overhead, as is for instance specified above, and is then serialized and output as a continuous serial data stream via the interface 170. Similarly, when the media converter 100 operates so as to receive serial data via the interface 170, the respective data are correspondingly recovered by the data recovery unit 140 and are fed to the receiver unit 120, in which a deserializer 123 parallelises the serial data stream and provides the parallel symbols to a block decoder 122 and subsequently to a line encoder 121 so as to provide the respective data symbols as a packet-based data stream to the interface 180.

FIG. 1c schematically shows a block diagram of the transmitter unit 110 according to one illustrative embodiment in more detail. The unit 110 comprises an input FIFO (first-in first-out memory) 114, the output of which is connected to the line encoder 111, which in turn is connected to an intermediate FIFO 115 that is connected to the block encoder 112. An output FIFO 116 is provided at the output of the block encoder 112 and supplies encoded symbols to the serializer 113. Moreover, an idle generator 117 is provided, which is connected to the line encoder 111 so as to provide idle symbols when a corresponding feedback signal on a feedback line 119 from the output FIFO 116 indicates a possible underflow of the FIFO 116. Moreover, the transmitter unit 110 comprises an ASM generator 118, which is configured to provide one or more ASM (attached synchronization marker) symbols that may be identified on a receiver side so as to allow the identification of respective forward error corrected symbol blocks.

During operation of the transmitter unit 110, the unit 110 performs the line encoding, such as an 8-bit/10-bit encoding, forward error correction encoding and a serialization of the incoming packet-based Ethernet frames, while simultaneously ensuring a continuous transmission of data bits at the output of the serializer 113. Moreover, the transmitter unit 110 performs the synchronization of the symbol blocks provided by the encoder 112 by means of specific ASM symbols provided by the generator 118. A continuous transmission of data at the serializer 113 may be obtained by means of the feedback signal provided by the output FIFO 116, that is, whenever the number of symbols in the output FIFO 116 is below a given threshold the input of the line encoder 111 receives a special symbol, denoted as K23.7, from the idle generator 117, which may also be referred to as idle symbol. Thus, in combination with the provision of interframe gap symbols, given by the pad data unit during silence phases, and real data, coming from the interface 180, a continuous stream of symbols is achieved.

The synchronization of the encoded symbol blocks may be achieved by, for instance, inserting, as ASM symbols, four special symbols of the line code, such as K28.5 according to the 8-bit/10-bit coding.

In one preferred embodiment, the line encoder 111 is implemented in the form of a commercial IP core based on the full code set proposed by A X Widmer and P A Franaszek in "A DC balanced partitioned block 8B/10B transmission code" published in IBM Journal Research Development vol 27, no 5. In other embodiments, an 8B/10B encoder may be mapped into a dedicated ASIC. The code specifies the encoding of an 8-bit byte (256 unique data symbols) and additional twelve special or (K) characters into a 10-bit symbol. The characteristics of the code scheme are appropriate for high speed local area networks, computer links or any serial data links. The code scheme is DC balanced, which is particularly advantageous for active gain, threshold setting and equalization of optical receivers. The code ensures a limited run length, that is, no more than five consecutive ones or zeros are generated, and a fixed density of transitions in the signal, which permits clock recovery from the data stream. The special (K) characters are useful as packet delimiters. A subset of these characters, referred to as commas, are unique in that their bit pattern never occurs in a string of serialized data symbols and hence can be used to determine symbol boundaries at the receiving end. For example, in the present invention the special symbol K28.5 is used for this purpose. The combination of these features allows the receiving end of an encoded 8B/10B data stream to extract the bit rate clock, to determine symbol and frame boundaries and to detect most transmission errors. These characteristics are obtained with a comparatively low overhead of 25%, which compares to for example a 100% overhead in a Manchester code.

The block encoder 112, which provides for a further redundancy on the basis of symbol blocks, is in one preferred embodiment implemented by means of a Reed-Solomon commercial IP core. In other embodiments, the block encoder 112 may be mapped in a dedicated ASIC.

Reed-Solomon codes are usually referred to as (n, k) codes where n is the total number of symbols in a code block and k is the number of information or data symbols. The Reed-Solomon core generates systematic code blocks, where the complete code block is formed by the k information symbols followed by the (n−k) check symbols. The maximum number of symbol errors in a block that may reliably be corrected is $T=(n-k)/2$, wherein a symbol error may contain any number of bit errors. In one illustrative embodiment, the selected code is a Reed-Solomon (1023, 959) code with a correction capability equal to 32. This code is appropriate in combination with the 8B/10B encoder 111 generating 10-bit symbols, which are compatible with the above Reed-Solomon code.

The input FIFO 114 is in one embodiment an asynchronous type having a symbol width of nine and a depth of sixteen symbols. Hereby, data are written at 1.25 MHz, that is, half of the RX-CLK clock frequency of 2.5 MHz, as the input data are provided as nibbles that are converted to bytes. Moreover, the FIFO 114 is read with the master clock frequency provided by the master clock source 131 (cf FIG. 1b). The FIFO 114 accepts data to be transmitted at its output from the interface 180, ie. couple of Ethernet nibbles, or from the idle generator 117, when the corresponding feedback signal on the line 119 from the output FIFO 116 indicates the necessity for an idle symbol so as to guarantee a continuous data transmission. In the preferred embodiment, the symbol width of the FIFO 114 is set to 9, where the most significant bit is used as a K input for the 8B/10B encoder 111 so as to distinguish between idle transmission symbols and true data symbols. The FIFO 114 is read each time it contains data. The symbol read out from the FIFO 114 is processed by the line encoder 111, which then outputs the corresponding 10-bit symbol. The line encoder 111 is fully synchronous to the master clock source 131, that is, at each rising edge of the master clock an 8-bit input symbol is sampled and transformed into the 10-bit output symbol.

Any coded symbols are stored immediately after generation in the intermediate FIFO 115, which is provided so as to separate the line encoder 111 and the block encoder 112, since the latter one needs to add a specified number of check symbols to the input information symbols, that is real data symbols plus idle symbols. For the above-specified Reed-Solomon encoder algorithm 68 symbols, ie. 64 check symbols and 4 AFM symbols, may be added. In one advantageous embodiment, the depth of the intermediate FIFO 115 is set to 128. In other embodiments, any other depth greater than the minimum depth of 68 may be used.

The intermediate FIFO 115 may be read in the following way. Once the first data symbol has been written and the block encoder 112 is available, the AFM generator 118 sends to the block encoder 112 the required number of AFM symbols, which in the present example are 4 AFM symbols. These symbols are K28.5 symbols that are transmitted in bypass mode and which pass straight through to the output with the inner latency of the selected IP core of the encoder 112. These AFM symbols have no effect on the generated check symbols. After the transfer of the AFM symbols, each written data symbol is passed to the block encoder 112, which automatically moves a delayed version of the symbol to the output and keeps a copy thereof internally for the check symbol generation. Once all information symbols, that is, for the above-specified case, the 959 information symbols are read, the block encoder 112 generates the 64 check symbols which are subsequently written to the output FIFO 116. The block encoder 112 is fully synchronous to the master clock, that is, at each rising edge of the master clock the input symbols are sampled and converted into the output symbols. A "ready for first data" output signal (not shown) is asserted high after the last check symbol sampling. A master clock cycle later, the "ready for first data" is de-asserted and the block encoder 112 is ready to accept the first data of a new block, which is read from the intermediate FIFO 115.

The output FIFO 116 is an asynchronous FIFO, wherein the write clock domain is in the master clock domain and the read clock domain is based on the signal clock SERCLK. In the embodiment shown, the output FIFO 116 may never be empty due to the feedback mechanism illustrated in the form of the feedback line 119, that inserts idle symbols in the previous blocks, whenever the number of symbols is under a certain threshold.

The serializer 113 may be provided in the present example as a 10-bit shift register for providing the serial data at the output of the transmit unit 110, wherein for example the most significant bit may be output first. Moreover, the transmitter unit is configured to perform a pop operation during operation at each tenth clock cycle of SERCLK to ensure a continuous serial transmission from the serializer 113.

Thus, incoming data symbols in the form of packets, which may comprise for instance $D_1, \ldots, D_K$ data symbols received by the input FIFO 114, are correspondingly line encoded by the encoder 111 and correspondingly encoded by the block encoder 112 by adding corresponding ASM symbols generated by the ASM generator 118 and any check symbols provided by the encoder 112, wherein depending on the feedback signal on the feedback line 119 delivered by the output FIFO 116 corresponding idle symbols provided by the generator 117 may be inserted, if required.

FIG. 1d schematically shows in the upper part a packet of data symbols $D_1, \ldots D_K$ obtained, for instance, according to an Ethernet protocol wherein the lower portion of FIG. 1d schematically illustrates a corresponding encoded block as delivered by the encoder 112 including in this example four ASM symbols followed by K data symbols with intermediate idle symbols, which have been inserted so as to maintain a proper timing with respect to the incoming data packet, thereby ensuring a continuous data traffic at the serial interface 170. Moreover, a plurality of check symbols are provided, in the present example 64 check symbols, $D_{check1} \ldots D_{check64}$, which contain information required for error correction during the decoding phase. For example, for the above-specified Reed-Solomon encoder a sequence of 959 input symbols, ie. data symbols and idle symbols is converted into the symbol sequence as shown in FIG. 1d. The corresponding symbol sequence is then converted into a serial bit data stream by the serializer 113 and output by the second interface 170.

For a data conversion in the opposite direction, a serial data stream may be received by the second interface 170 and may be supplied to the data recovering unit 140 (cf FIG. 1b). The data recovering unit 140 is configured to extract data from the incoming serial data stream and to move the extracted data bit into a separate clock domain. In one preferred embodiment, the data recovery unit 140 is completely digital and has implemented therein an oversampling technique.

During operation of the data recovering unit 140 incoming input data may be recovered without recovering the clock signal, on the basis of which the data stream received has been transmitted. It should be appreciated that in other embodiments the clock signal and the data bits may be recovered by means of a PLL technique.

In one embodiment using a fully digital configuration, a clock reference signal is used by the data recovering unit 140 which is based on the nominal frequency of the data stream being decoded, which may be for instance 13.64 MHz, and is multiplied by a factor of 8, while it should be appreciated that other values may also be used. A shift register (not shown) may be used to divide the local frequency by 8, thereby creating eight enable signals each one shifted in phase with respect to the other by ⅛ of the bit period, i.e. the eight enable signals have a phase difference of 45 degrees.

FIG. 1e schematically shows corresponding enable signals EN-A, . . . EN-H with respect to data signals and the initial local clock signal. The enable signals EN-A, . . . EN-H are used to sample the incoming data signal, thereby defining eight different time domains within each bit period of the incoming bit stream, as may be seen from FIG. 1e. Thus, each time domain represents a single sample point for evaluating the bit value of the incoming data bits.

A matrix of 64 flip-flops (not shown) may be provided in the data recovering unit 140 in order to move the eight samples at the same time domain so that they can be analyzed for determining the value of the incoming data bit. The data recovering unit 140 is further configured to detect the time domain at which each transition from a "0" to "1" or a "1" to "0" occurs. The corresponding time domain is that time domain that first identifies the respective value change in the incoming data. In one embodiment, the time domain located a half bit period ahead, in the present example four time domains ahead, may then be chosen as the sampling domain, since it may be assumed that this time domain is located next to the centre of the received bit. In one preferred embodiment, an enhanced tolerance to noise is provided by means of a majority voter implemented in the data recovering unit 140. Thus, in one embodiment, not only the centre time domain may be used for assessing the bit value of the currently detected bit, but the three central sample points or time domains may be considered and the decision may be based on the majority of coinciding bit values at the respective three sampling points. Thus, enhanced immunity with respect to possible spurious spikes that may be present in the incoming analogue data signal may be achieved. It should be appreciated that due to unavoidable inaccuracies in the frequency used in the transmitter and the clock signal used in the data recovering unit 140, the corresponding eight or more or less enable signals (cf FIG. 1e) may either be slightly faster or slightly slower than the incoming data stream. As will be described later on in more detail, particular attention is given in the media converter 100 so as to enhance the tolerance of the system to this frequency mismatch and to provide means for countering the jitter affecting the clock and the input data signal. As explained previously, the media converter 100 is designed to be used in applications such as POF links having a length of 200 m and even more, in which high bit error rates and cycle to cycle jitter of approximately 30% of the bit period may be encountered. A corresponding compensation mechanism will be explained with reference to the function of the receiver unit 120.

FIG. 1f schematically shows a block diagram of the receiver unit 120 according to one illustrative embodiment. In this embodiment additionally to the line decoder 121, the block decoder 122 and the deserializer 123, the unit may further comprise a block synchronization unit 128, and input FIFO 126 provided between the block synchronization unit 128 and the block decoder 122, and an interframe gap control FIFO 125 provided at the output of the line decoder 121. Moreover, an interframe gap control unit 127 is provided, which is operatively connected to the block decoder 122 and the output of the interframe gap control FIFO 125. Finally, an output FIFO 124 is connected with its input to the interframe gap control FIFO 125 and the interframe gap control unit 127. During operation, the deserializer 123 receives from the data recovering unit 140 the serial data that have to be converted into corresponding data packets in accordance with the respective protocol. For example, the Ethernet frames embedded into the serial data received by the deserializer 123 have to be provided at the output of the receiver unit 120, wherein each incoming Ethernet frame has to be recovered at the output without any inner breaks, whereas the interframe gaps between frames has to be more or less modified, without shortening the any interframe gap below 9.6 microseconds in order to correspond to the Ethernet standard. Thus, the receiver unit 120 decodes the incoming serial data stream, thereby removing any ASM and idle symbols, such as the K28.5 and K23.7, check symbols used for the forward error correction and also implements an efficient algorithm for the interframe gap modulation so as to compensate for any timing mismatches between the receiver and the transmitter, as previously indicated.

The deserializer 123, which may be provided as a shift register for parallelizing the incoming data to corresponding 10-bit symbol, provides the same to the block synchronization unit 128 which may be configured to compare the incoming symbol with the predefined ASM sequence, as is previously described with reference to FIG. 1f. The positive identification of the predefined ASM symbol(s) may be considered as the starting point for the synchronization procedure.

FIG. 1g schematically shows a corresponding synchronization state machine 160, which may be implemented in the block synchronization unit 128. The state machine 160 may comprise an acquisition phase or state 161, which may be entered at power on of the system or after completely losing the synchronization. During acquisition in the state 161 data are not transferred to the following blocks, ie. the input FIFO 126 but the corresponding data may be discarded. As may be seen from FIG. 1g, during the acquisition phase 161, the state machine 160 may wait for identifying a first group of four ASM symbols, referred to as ASM0 and may do so for a plurality of ASM symbols groups depending on the synchronization scheme used during the block decoding. In the present case, the synchronization scheme is based on the identification of five subsequently groups ASM0, ASM1, . . . ASM4, as is explained with reference to FIG. 1d, where each group is composed by four ASM symbols. Thus, in one preferred embodiment, the acquisition phase 161 is left and a tracking state 162 is entered upon the detection of five consecutive groups of ASM symbols. For example, for a worst case bit error rate of $10^{-3}$ the probability that this acquisition procedure fails and must be repeated is equal to 14%, while the probability for incorrectly transiting from the acquisition phase 161 to the tracking state 162 is approximately $10^{-49}$. In other embodiments, the number of required identified groups of ASM symbols may be less than 5, thereby providing a lower failure probability while increasing the probability for an incorrect transition from the acquisition phase 161 to the tracking state 162.

In the tracking state 162 typically a new group of four ASM symbols appears after 1023 10-bit symbols for the above specified encoding algorithm. If the required number of four ASM symbols may not correctly be detected after receipt of the 1023 symbols, the state machine 160 may transit into a corresponding error state 163, indicated as ERR1, in which the following 1023 symbols may also be considered as valid data symbols. If the correct number of ASM symbols is detected after the preceding 1023 symbols, the state machine 160 may again return to the tracking state 162. Otherwise, the state machine 160 may remain in the error state 163, wherein in one embodiment, a higher "error level" is then assumed. In one embodiment, the state machine 160 may move from one error state to a higher order error state, and while reaching the uppermost error state, such as the error state ERR16 in FIG. 1g, it may be decided that the synchronization is completely lost and the state machine 160 transits into the initial state in the acquisition phase 161. For a worst case bit error rate of $10^{-3}$, the probability for wrongly leaving the tracking state 162 is approximately $10^{-23}$. It should be appreciated, however, that in other embodiments this probability may be differently selected by using a different number of total error states.

Again referring to FIG. 1f, during the tracking state the ASM symbols are removed and the valid symbols are written into the input FIFO 126. In this way, the symbols are parallelized correctly and each encoded block to be decoded by the block decoder 122 is correctly isolated. The block encoder 122 may be provided in one illustrative embodiment in the form of a Reed-Solomon IP commercial core, as is also explained with reference to the transmit unit 110. The Reed-Solomon decoder samples the symbols and attempts to correct any errors on the basis of the corresponding check symbols. As previously explained, the maximum number of symbol errors in a block that can be guaranteed to be corrected by the Reed-Solomon algorithm is 32 for the Reed-Solomon (1023, 959) configuration. Hereby, each symbol error may contain any number of bit errors. As already explained with reference to the transmitter unit 110, the block decoder 122 may be implemented in the form of a field programmable gate array or in a dedicated ASIC.

Since the block decoder 122 may not operate in a continuous way due to the processing delay for the selected Reed-Solomon (1023, 959) code, a corresponding block is stored in the intermediate FIFO 126 and is supplied to the block encoder 122 once it is available for the processing of new input data. At each cycle of the master clock 131, the block decoder 122 pops one symbol at a time until all symbols of a block are internally processed. After a given latency the check symbols are removed and a corrected version of the 959 information data symbols is generated, which are now ready for output. The outputs are also synchronized with the master clock source 131 and are passed to the line decoder 121, which is configured to decode the line decoded symbols, ie. in the present embodiment, the 10-bit symbols into the appropriate 8-bit symbols or characters. As previously explained, the line decoder 121 may be implemented in the form of a field programmable gate array by a commercial IP core based on the full 8B/10B code set, as is also explained with reference to the line encoder 111. In other embodiments, the decoder 121 may be mapped in a dedicated ASIC. Moreover, the line decoder 121 is configured to add the corresponding redundancy information, ie. the K (special character of the 8B/10B code)-output information, so as to distinguish between real data symbols and special characters. The corresponding decoded symbols or characters and the respective K-outputs, which are fully synchronized to the master clock source 131, are then written into the interframe gap control FIFO 125, which therefore contains real data symbols, idle symbols, interframe gap symbols, or other special characters, which may be obtained from an erroneous detection of incoming data, while the ASM symbols have already been removed. In one preferred embodiment, the receiver unit 120 is configured to pass all data except for idle symbols (K23.7) to the output FIFO 124. In other embodiments any interframe gap symbols and real data symbols only are allowed, while idle symbols and wrongly detected special characters are stopped.

As previously explained, slight frequency mismatches between a receiver and a transmitter may have to be considered and also corresponding silent gaps between internet packets have to be, in principle, maintained while excessive extension or shortening of the corresponding gaps according to the Ethernet protocol has to be avoided. Since the block decoder 121 processes the data block-wise a first mechanism was introduced involving the pad data unit 150 (cf FIG. 1b) in the transmit unit 110, so as to insert interframe gap symbols (K27.7 according to the 8B/10B code) during interframe gaps according to the Ethernet protocol. Although transmitting symbols also during a silence phase in the packet-based data stream may stress the media converter 100, in the absence of the pad data unit 150 a silent gap restored at the receiver unit 120 could be highly different from the original one and also a certain time gap might be inserted into an Ethernet frame, thereby "breaking" the corresponding Ethernet frame. Moreover, as previously mentioned, owing to the inevitable slight mismatch between the transmitter and receiver clocks, the continuous flow of idle symbols, interframe gap symbols and real data symbols may result in a overflow of the FIFO 124, in case the receiver clock is slower, or underflow in case the receiver clock is faster.

For compensating overflow and underflow situations, the interframe gap control unit 127 (cf FIG. 1f) is provided and has implemented a dedicated algorithm for modulating the interframe gap by adding or removing interframe gap symbols from the output FIFO 124, when an underflow or an overflow situation is predicted.

In one embodiment, the prediction is performed after writing a first block of decoded symbols received from the interframe gap control FIFO 125 into the output FIFO 124 without further control activity and an overflow or underflow detection is estimated or predicted on the basis of the first block.

Figure 2B:
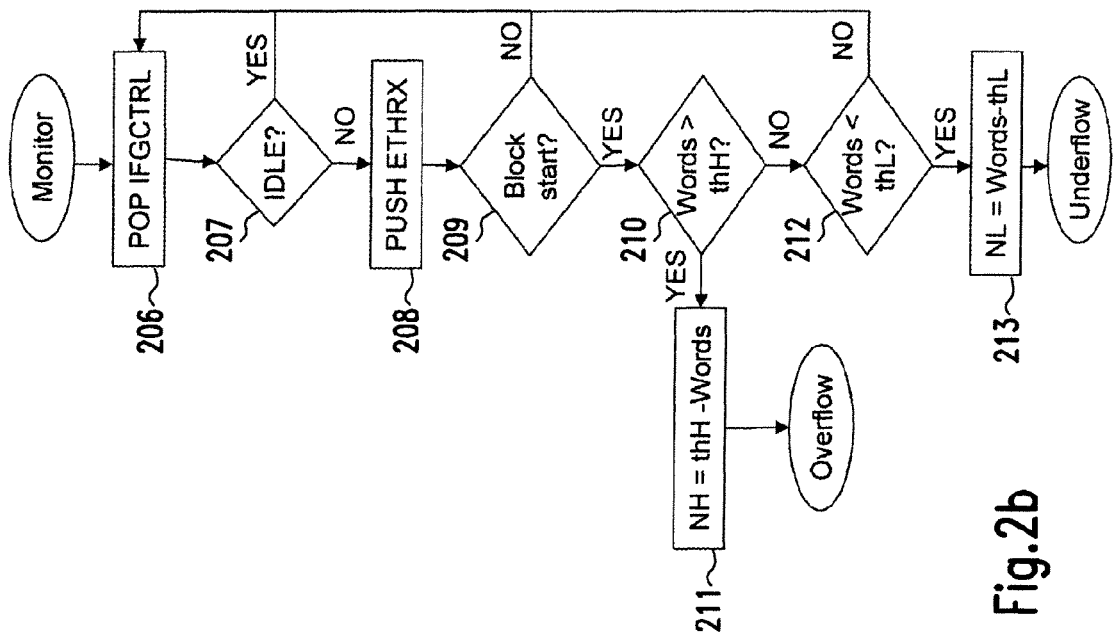
Figure 2A:
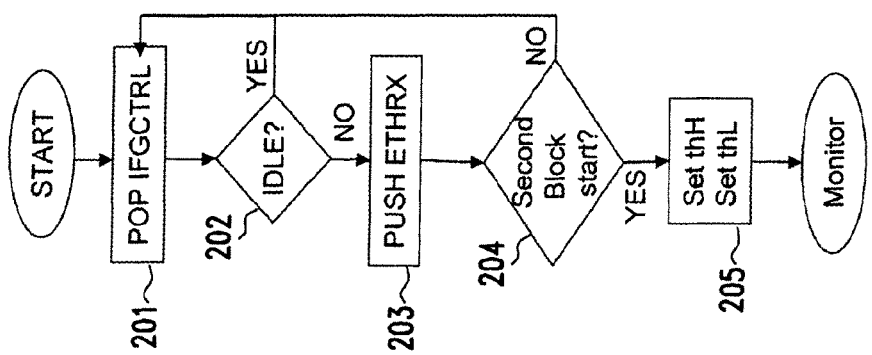

FIG. 2a illustrates a flow diagram for determining appropriate threshold values for indicating an overflow or underflow situation. In step 201, a symbol is retrieved from the interframe gap control FIFO 125 and is assessed whether or not it is an idle symbol in step 202. When the symbol read from the FIFO 125 is an idle symbol, the flow returns to step 201 and retrieves another symbol from the FIFO 125. If in step 202 the symbol is not an idle symbol, the corresponding symbol is pushed into the output FIFO 124 in step 203. In step 204 it is assessed whether or not the second block is started. If so, appropriate threshold values for an overflow situation thH and an underflow situation thL are selected in step 205. If in step 204 the start of the second block is not detected, the process flow returns to step 201. Thus, at the beginning of each of the blocks following the very first block the number of words in the output FIFO 124 may be compared to the thresholds thH and thL, wherein an underflow situation is predicted if the number of symbols is less than thL, while an overflow situation is predicted if the number of symbols is higher than thH.

FIG. 2b shows a flow diagram for estimating whether or not an overflow or underflow situation may be expected. In step 206, the interframe gap control FIFO 125 is retrieved and it is assessed in step 207 whether or not the corresponding symbol is an idle symbol. If so, the process flow returns to step 206. If no idle symbol is detected in step 207, the respective symbol is pushed into the output FIFO 124 in step 208 and in step 209 it is assessed whether or not a new block start signal is received from the block encoder 122. When no block start occurs in step 209, the flow returns to step 206. On the other hand, if a block start is detected in step 209, it is assessed whether the number of symbols in the output FIFO 124 is higher than the overflow threshold thH in step 210. If so, a number NH=thH−number of words, is calculated in step 211, which is then used in a corresponding overflow handling routine. When in step 210 the number of words in the output FIFO 124 is less than the overflow threshold the flow advances to step 212, in which the number of words is compared to the underflow threshold thL and the process flow returns to step 206, when the words is within a valid range. When in step 212 the number of words is below the threshold thL, the process flow advances to step 213, in which a corresponding number NL=number of words−thL is calculated, which may then be used for the handling of the underflow situation.

In the underflow situation, as soon as interframe gap symbols are fed from the interframe gap control FIFO 125, the reading is disabled by the interframe gap control unit 127 and additional interframe gap symbols generated by the control unit 127 are written to compensate for the difference between the detected number of words and the corresponding underflow threshold. In case an overflow situation is predicted, as soon as interframe gap symbols are fetched from the FIFO 125, a predefined number of interframe gap symbols, such as twelve interframe gap symbols, are generated by the control unit 127 and pushed into the output FIFO 124 in order to ensure the minimum interframe gap, for instance 9.6 microseconds for an Ethernet frame. The following interframe gap symbols are deleted from the interframe gap control FIFO 125 and not pushed into the output FIFO 124.

Figures 2C, 2D:
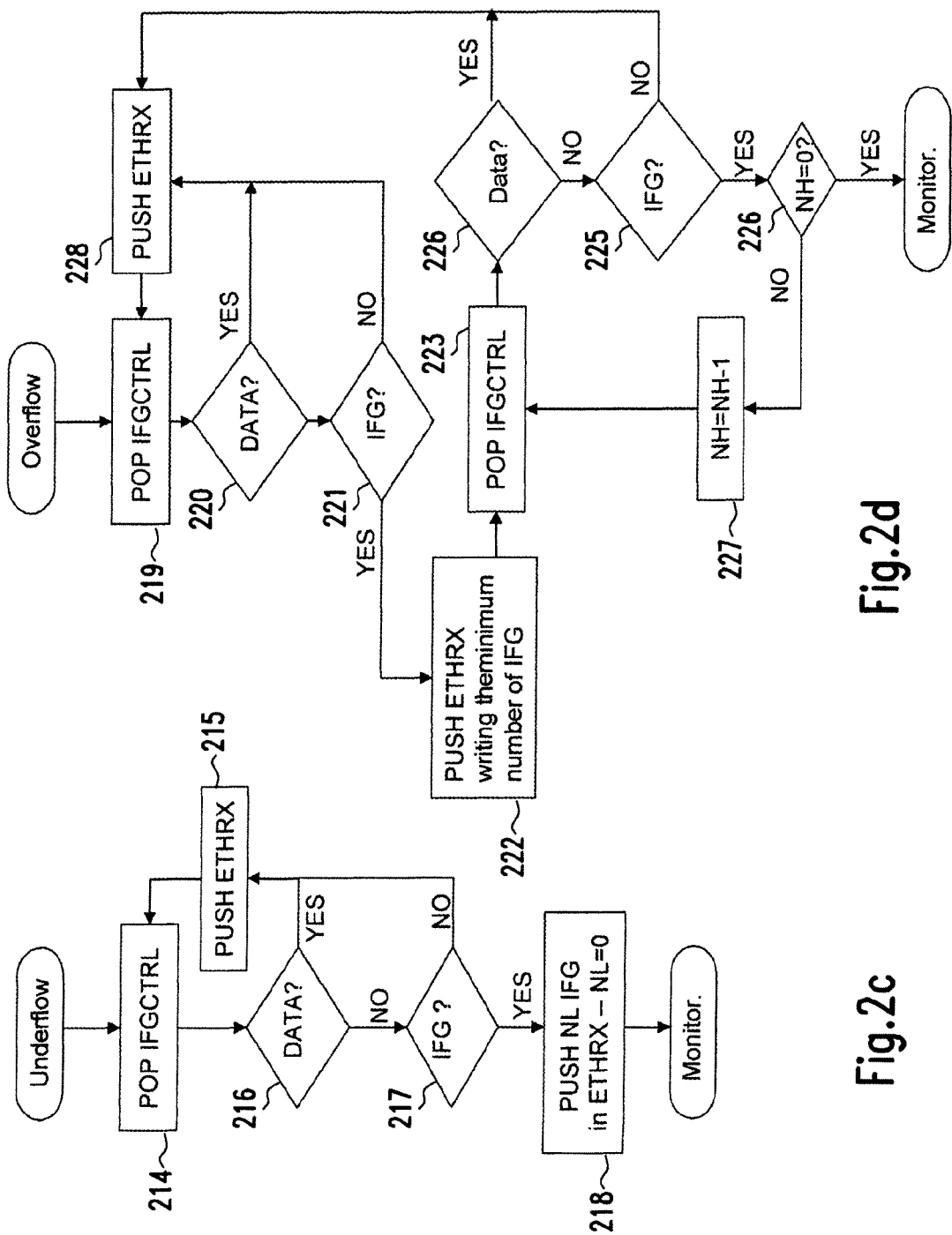

FIG. 2c illustrates a flow diagram for handling an underflow situation according to the above strategy. In step 214 the interframe gap control FIFO 125 is retrieved and the corresponding symbol is assessed in step 216. When the symbol is assessed to be a data symbol, it is pushed into the output FIFO 124 in step 215. If in step 216 the symbol is assessed to be not a data symbol, in step 217 it is determined whether or not the symbol represents an interframe gap symbol. If it is not assessed as an interframe gap symbol, it is pushed into the output FIFO 124. If in step 217 the symbol is identified as an interframe gap symbol, in step 218 NL interframe gap symbols are pushed into the output FIFO 124, thereby efficiently avoiding any FIFO underflow.

FIG. 2d illustrates a flow diagram for handling overflow situation, as described above. In steps 219, 220 and 221, symbols are retrieved from the FIFO 125 and assessed with respect to data or interframe gap symbols and in case of a data symbol, it is pushed into the output FIFO 124 in step 228. That is, the steps 219, 220, 221 and 228 correspond to the steps 214, 216, 217 and 215 of the flow diagram of FIG. 2c. If in step 221 the symbol is assessed to be an interframe gap symbol, the process flow advances to step 222, in which a required minimum number of interframe gap symbols is written into the output FIFO 124, which may be for instance twelve interframe gap symbols. Then, in step 223 the interframe gap control FIFO 125 is read and the corresponding symbols are assessed with respect to data or interframe gap symbols in steps 224 and 225, respectively. If in step 225 the symbol is assessed to be an interframe gap symbol, the flow advances to step 226, in which it is assessed whether a magnitude of overflow, ie. the previously determined number NH is equal to 0. If so, the overflow handling routine is completed. If not, the corresponding overflow handling number is decremented in step 227 and the process flow returns to step 223 for reading the interframe gap control FIFO 125.

Consequently, an efficient mechanism is provided so as to establish a continuous serial data flow on the one side while providing a packet-based data flow on the other side with high bit error rate tolerance, while providing a mechanism for effectively preventing overflow and underflow of the FIFOs.

With respect to the FIFOs, the output FIFO 124 may be an asynchronous FIFO wherein the write clock domain is based on the system master clock source 131 while the read clock domain is based on signal TX-CLK (cf FIG. 1b). The depth of the output FIFO is chosen to store at least two block encoder/decoder blocks. Since only real data symbols are transmitted by the first interface 180, which is therefore silent in the time slot occupied by interframe gap symbols, the receiver unit is further configured to remove interframe gap symbols after any pop operations. The interframe gap control FIFO 125 is a synchronous FIFO working on the master clock domain having a depth for storing symbols from the line decoder 121 when the reading is disabled, that is, in an underflow situation. The depth may be selected on the basis of a maximum tolerated frequency mismatch between the receiver and transmitter clock frequencies. In one preferred embodiment, a depth of 64 symbols may be chosen, while in other embodiments a different depth may be used. Thus, in one embodiment, the input FIFO 126 may be a synchronous FIFO having a symbol width of 10 bits and a depth of 1024 symbols. The interframe gap control FIFO 125 may be a synchronous FIFO having a symbol width of 9 bits and a depth of 64 symbols. The output FIFO 124 may be an asynchronous FIFO having a symbol width of 9 bits and a depth of 2048 symbols.

The invention claimed is:

1. A media converter comprising:
a first interface configured to receive and provide a first type of data stream based on data packets,
a second interface configured to receive and provide a second type of data stream based on a continuous serial bit stream,
a signal processor, which comprises a transmitter unit including a line encoder, connected to the first and second interfaces and configured to convert said first type of data stream into an output continuous serial bit stream and said second type of data stream into an output data packet data stream on the basis of a block encoding or decoding algorithm and a line encoding or decoding algorithm, wherein
said signal processor comprises a pad data unit connected to said first interface and configured to add specified symbols to said first type of data stream during silence phases in said first type of data stream, said transmitter unit comprises an idle generator connected to an input of said line encoder, said idle generator being configured to supply a specified idle symbol to the input of said line encoder; and
said signal processor is configured to transmit from the media converter at least said output data packet data stream over an interface other than the second interface.

2. The media converter of claim 1, wherein said second type of data stream represents a NRZ (non-return to zero) encoded bit stream.

3. The media converter of claim 1, wherein said signal processor comprises a block encoding or decoding section operating on the basis of a forward error correction algorithm.

4. The media converter of claim 1, wherein said signal processor comprises a line encoding or decoding section operating on the basis of an 8 bit or 10 bit conversion algorithm or other n bit or m bit line encoding.

5. The media converter of any of claim 1, wherein said signal processor further comprises a receiver unit including a deserializer, a block decoder and a line decoder and wherein said transmitter unit further comprises a block encoder and a serializer.

6. The media converter of claim 5, wherein said signal processor further comprises a clock generation unit connected to said transmitter unit and said receiver unit.

7. The media converter of claim 5, further comprising a clock input configured to receive an external clock signal for operating said transmitter unit and said receiver unit.

8. The media converter of claim 5, wherein said signal processor further comprises a data recovering unit connected to said second interface to receive a serial bit stream and configured to identify individual bits in said serial bit stream.

9. The media converter of claim 8, wherein said data recovering unit is a digital unit operating on the basis of an oversampling technique.

10. The media converter of claim 9, wherein said data recovering unit comprises a majority voter mechanism for determining a value of a data bit received via said second interface.

11. The media converter of claim 10, wherein said majority voter mechanism is based on at least three sample time domains.

12. The media converter of claim 11, wherein said data recovering unit comprises a phase locked loop circuit for extracting data bits and a clock signal from said serial bit stream.

13. The media converter of claim 1, wherein said first interface comprises a media independent interface including a transmitter section and a receiver section, said receiver section configured to receive a first continuous clock signal for a nibble based data reception, said transmitter section configured to be operated with a second continuous clock signal for a nibble based data transmission.

14. The media converter of claim 5, wherein said transmitter unit is configured to provide a continuous transmission at an output of said serializer.

15. The media converter of claim 14, wherein said transmitter unit further comprises an output first-in-first out (FIFO) connected between said block encoder and said serializer and wherein said idle generator is further connected to a control output of said output FIFO, and said idle generator supplies said specified idle symbol on the basis of a predefined status of said control output.

16. The media converter of claim 15, wherein said input FIFO is connected to receive symbols from said idle generator.

17. The media converter of claim 16, wherein a symbol width of said input FIFO is selected to provide at least one extra bit for distinguishing data symbols received from said first interface and idle symbols received from said idle generator.

18. The media converter of 17, wherein said line encoder comprises a control input for receiving said at least one extra bit and is configured to encode said data symbols and said symbols on the basis of said received extra bit.

19. The media converter of claim 5, wherein said transmitter unit further comprises an attached synchronization marker (ASM) generator configured to insert one or more predefined synchronization symbols into a data stream provided by said line encoder.

20. The media converter of claim 5, wherein said block encoder comprises a Reed-Solomon encoding scheme or at least one forward error correction technique.

21. The media converter of claim 5, wherein said transmitter unit further comprises an input first-in-first out (FIFO) connected to receive data symbols via said first interface, and an intermediate FIFO connected between said line encoder and said block encoder.

22. The media converter of claim 21, wherein said intermediate FIFO has a capacity of at least the number of check symbols and synchronization symbols generated by the ASM generator and said block encoder.

23. The media converter of claim 5, wherein said block decoder in said receiver unit comprises a Reed-Solomon decoder or other forward error correction decoder.

24. The media converter of claim 5, wherein said deserializer comprises a shift register for parallelizing incoming serial data into symbols having a width corresponding to the input width of said line decoder.

25. The media converter of claim 24, wherein said receiver unit further comprises a block synchronization unit configured to identify an attached synchronization marker symbol and a synchronization state machine for performing a synchronization procedure upon identification of an attached synchronization marker symbol.

26. The media converter of 25, wherein said synchronization state machine comprises an acquisition state for identifying a predefined number of attached synchronization marker symbols.

27. The media converter of claim 26, wherein said synchronization state machine further comprises a tracking state for gathering a predefined number of symbols according to an input block length of said block decoder.

28. The media converter of claim 27, wherein said synchronization state machine further comprises an error state detection mechanism that is initiated when no attached synchronization marker symbol is identified after gathering said predefined number of symbols.

29. The media converter of claim 28, wherein said receiver unit further comprises a block FIFO connected between said block synchronization unit and said block decoder for storing said predefined number of symbols received from said block synchronization unit.

30. The media converter of claim 5, wherein said line decoder comprises a control output to indicate whether or not a decoded symbol is a real data symbol.

31. The media converter of claim 30, wherein said receiver unit further comprises packet gap control FIFO connected to receive decoded symbols from said line decoder.

32. The media converter of claim 31, wherein said receiver unit further comprises an output FIFO connected to said packet gap control FIFO and a packet gap control unit.

33. The media converter of claim 32, wherein said packet gap control unit is configured to remove specific non-data symbols included in a group of data symbols forming a data packet and to pass all other symbols prior to storing symbols in said output FIFO.

34. The media converter of claim 33, wherein said packet gap control unit is further configured to remove any non-data symbols except for symbols representing an inter frame gap of said data stream of the first type.

35. The media converter of claim 32, wherein said packet gap control unit is further configured to at least one of add or remove symbols from said output FIFO that represent an inter frame gap of said data stream of the first type for compensating a timing mismatch between the second type of data stream and an operating frequency of the receiver unit.

36. A bi-directional signal conversion system comprising: a media converter according to claim 1, a first physical layer device configured to receive and provide said first type of data stream in the form of electric signals, a second physical layer device configured to receive and provide said second type of data stream in the form of optical signals.

37. The bi-directional signal conversion system of claim 36, wherein said second physical layer device comprises an optical transmitter device and an optical receiver device connected to an optical fibre.

38. The bi-directional signal conversion system of claim 37, wherein said optical fibre comprises a core made of plastic material.

39. The bi-directional signal conversion system of claim 38, wherein said optical receiver device and said optical transmitter device have an operating wavelength in the range of 400 nm to 650 nm.

40. The bi-directional signal conversion system of claim 37, wherein said optical fibre comprises a glass material core.

41. The bi-directional signal conversion system of claim 40, wherein said optical receiver device and said optical transmitter device have an operating wavelength in the range of 800 nm to 1600 nm.

42. A method of converting packet based data into serial data and vice versa, the method comprising:
  receiving an incoming packet-based optical data stream over a first interface and converting the incoming packet-based optical data stream into a continuous serial output optical data stream on the basis of line encoding and block encoding,
  receiving an incoming continuous optical data stream over a second interface and converting the incoming continuous optical data stream into a packet-based output optical data stream on the basis of block decoding and line decoding; and
  providing the continuous serial output optical data stream for transmission over the second interface and providing the packet-based output optical data stream for transmission over the first interface.

43. The method of claim 42, wherein said line encoding comprises providing a specified amount of redundancy for enhancing a bit error rate tolerance.

44. The method of claim 42, wherein said block encoding comprises providing a predefined amount of redundancy for block synchronization and forward error correction.

45. The method of claim 44, wherein said predefined redundancy is 13.8% or more.

46. The method of claim 42, further comprising modulating an interframe gap time of said packet-based output optical data stream so as to compensate for a frequency mismatch between said incoming continuous optical data stream and said line and block decoding.

47. The method of claim 46, wherein modulating of an interframe gap time comprises adding or removing interframe gap symbols from decoded symbols on the basis of a FIFO contents, said FIFO being used for decoding said incoming continuous optical data stream.

* * * * *